United States Patent
Marrow et al.

(10) Patent No.: US 7,835,466 B1
(45) Date of Patent: Nov. 16, 2010

(54) BASELINE WANDER COMPENSATION FOR PERPENDICULAR RECORDING

(75) Inventors: Marcus Marrow, Santa Clara, CA (US); Shih-Ming Shih, San Jose, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 847 days.

(21) Appl. No.: 11/786,762

(22) Filed: Apr. 11, 2007

Related U.S. Application Data

(60) Provisional application No. 60/901,956, filed on Feb. 16, 2007.

(51) Int. Cl.
*H04L 25/06* (2006.01)
*H04L 25/10* (2006.01)

(52) U.S. Cl. .......................... 375/317; 360/39; 360/46; 360/68

(58) Field of Classification Search ................ 375/317; 360/39, 46, 68
See application file for complete search history.

(56) References Cited

U.S. PATENT DOCUMENTS

| | | | | |
|---|---|---|---|---|
| 6,775,529 | B1 * | 8/2004 | Roo | 455/296 |
| 7,167,327 | B2 * | 1/2007 | Feyh | 360/46 |
| 7,710,674 | B2 * | 5/2010 | Esumi et al. | 360/46 |
| 2008/0159415 | A1 * | 7/2008 | Miller et al. | 375/258 |

* cited by examiner

*Primary Examiner*—Ted M Wang
(74) *Attorney, Agent, or Firm*—Van Pelt, Yi & James LLP

(57) ABSTRACT

Baseline wander is removed. A first decision signal is generated from an input signal using a first detector. Baseline wander associated with the input signal is estimated using the first decision signal. The estimated baseline wander is removed from the input signal. A second decision signal is generated from the input signal with the baseline wander removed using a second detector.

10 Claims, 6 Drawing Sheets

BASELINE WANDER COMPENSATION FOR PERPENDICULAR RECORDING

CROSS REFERENCE TO OTHER APPLICATIONS

This application claims priority to U.S. Provisional Patent Application No. 60/901,956 entitled BASELINE WANDER COMPENSATION CIRCUIT FOR PERPENDICULAR RECORDING SYSTEM filed Feb. 16, 2007 which is incorporated herein by reference for all purposes.

BACKGROUND OF THE INVENTION

Recordings on a magnetic disk can be performed either longitudinally or perpendicularly. In longitudinal recording, information is stored within or parallel to the plane of the magnetic disk. In perpendicular recording, information is stored perpendicular to the plane. Longitudinal recording products have been commercially available for some time; new perpendicular recording products are being developed because of the potential for much higher storage capacity compared to longitudinal recording.

Perpendicular recording has some issues associated with it that were not previously encountered or were not as noticeable with longitudinal recording; baseline wander is one such issue. Although there are techniques that address baseline wander, they may be unattractive due to a variety of reasons. For example, some existing techniques add noise, have a slower response time than the baseline wander, and/or discard some of the signal, thus reducing the amount of signal used in error correction decoding. New techniques for dealing with baseline wander that overcome some or all of these drawbacks would be attractive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
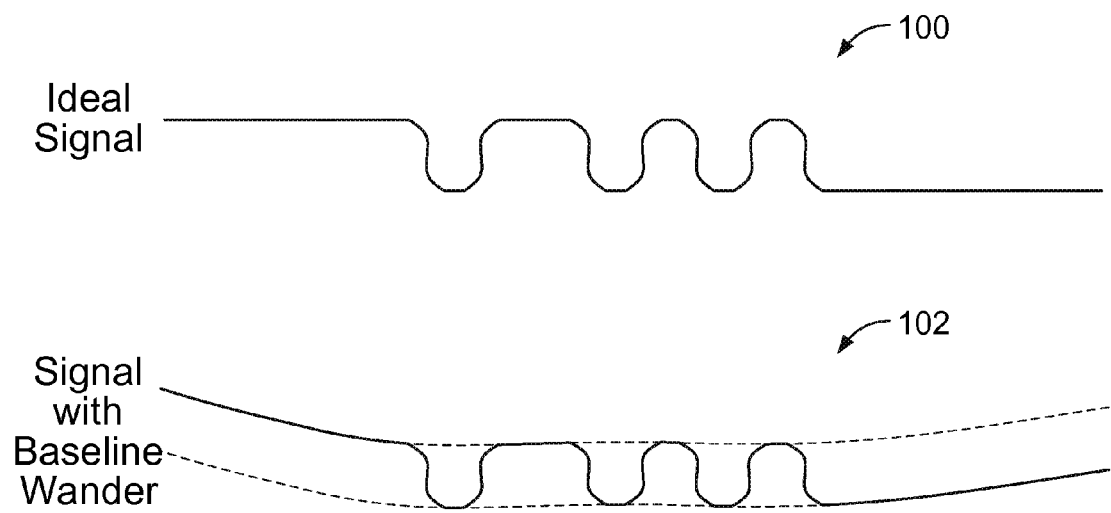
FIG. 1 is a diagram illustrating an example of an ideal signal and a signal with baseline wander.

FIG. 1 is a diagram illustrating an example of an ideal signal and a signal with baseline wander. In the example shown, the signals are read signals associated with magnetic disk storage. Signal 100 is an ideal signal. Values are stored magnetically as 0's or 1's on the recording media and are read back. Signal 102 corresponds to ideal signal 100 but includes baseline wander. As shown in this example, baseline wander affects the overall signal level, so that (for example) the value or measurement of a 1 at any two points in time are not necessarily the same.

In some disk drive systems, capacitance in the system causes a notch at or near DC. Such a notch may result in baseline wander. The following figure shows an example.

Figure 2:
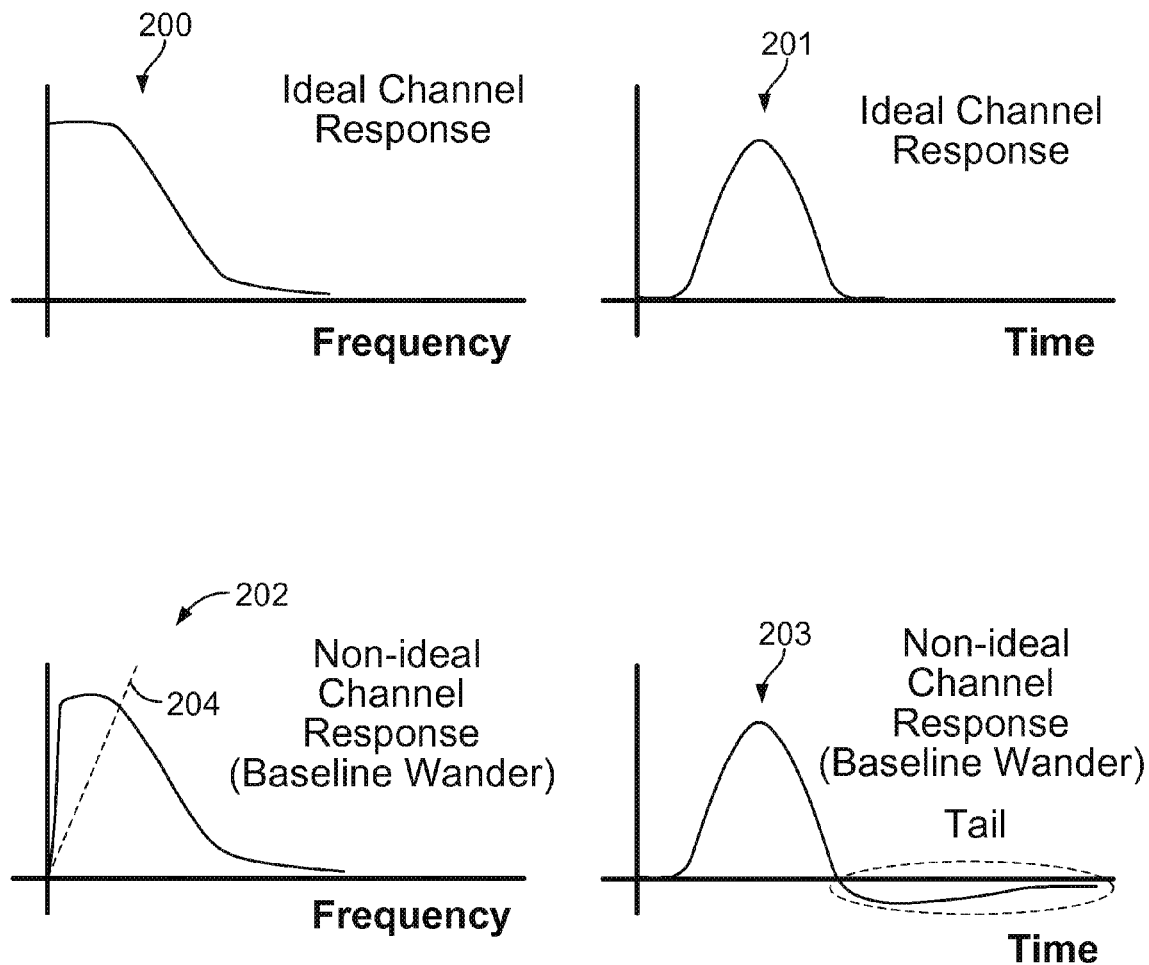
FIG. 2 is a diagram illustrating some examples of channel responses.

FIG. 2 is a diagram illustrating some examples of channel responses. In the example shown, graphs 200 and 202 correspond to the frequency domain and graphs 201 and 203 correspond to the time domain. Graphs 200 and 201 show ideal, conditions and graphs 202 and 203 show non-ideal conditions. In some cases, the frequency domain channel response shown in graph 202 results from capacitance in a disk drive system, creating at notch at or near DC. In the time domain, graph 203 shows that this notch corresponds to a tail. Often, this tail is relatively long compared to the non-tail portion of the signal. For example, a non-tail portion may be 2 or 3 bits long and a tail portion may be on the order of 100 bits long.

If the baseline wander is not removed or compensated for, a system may have to be modified in order to handle the baseline wander or the error rate may increase to an undesirable level. One typical modification is to increase the number of samples evaluated or processed by a Viterbi decoder in order to make a decision. This often corresponds to an increase in the latency and/or size of the Viterbi decoder or other detector used to error correct the read signal.

There are a variety of existing techniques to remove or compensate for baseline wander. One technique is to change the channel response in the frequency domain to reduce the length of the tail in the time domain. For example, in graph 202, information above line 204 is discarded (e.g., using a differentiator). However, this may be unattractive because some signal is discarded, and less information is available to a downstream decoder which may degrade the performance of the downstream decoder. Discarding information is unattractive for perpendicular recording in particular because there is more signal at lower frequencies compared to longitudinal recording.

Some other techniques for removing baseline wander use offset loops. In some cases, baseline wander changes faster than the offset loop is able to respond. Also, noise may be introduced by the offset loop.

What is disclosed is a technique for removing or otherwise compensating for baseline wander. A detector processes a read signal (e.g., after filtering and/or analog to digital conversion) and generates decisions. Using these decisions, a tail is estimated, modeled or otherwise generated. This generated tail is then removed from the signal from which the decisions were made, and detection is performed on the signal with the tail removed. In some embodiments, the detector used to model the tail is faster than (i.e., has lower latency) or is less powerful than the detector used to process the signal with the tail removed.

Figure 3:
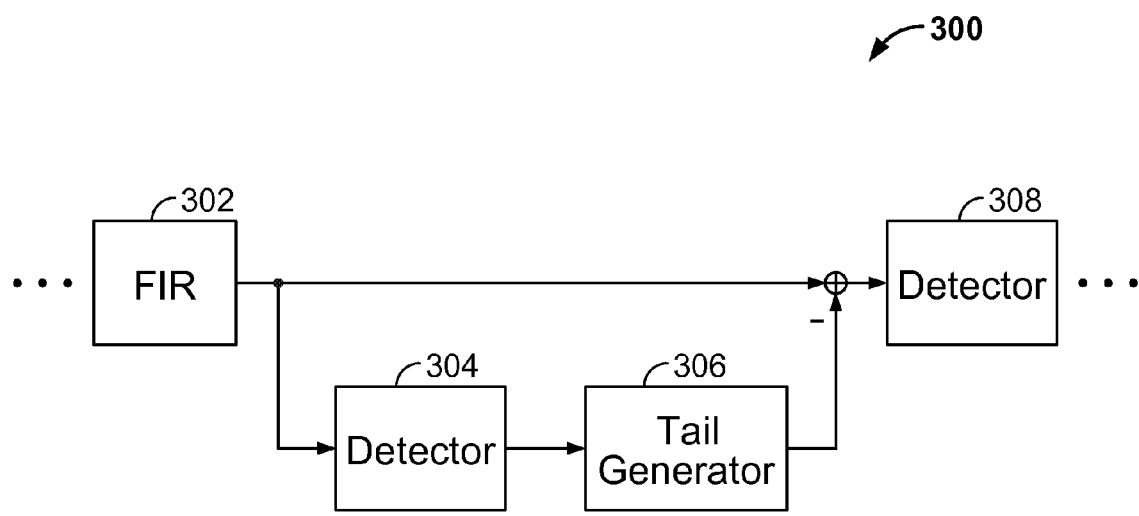
FIG. 3 is a diagram illustrating an embodiment of a system that removes a tail associated with baseline wander using a detector.

FIG. 3 is a diagram illustrating an embodiment of a system that removes a tail associated with baseline wander using a detector. In the example shown, system 300 is part of a disk drive system. Finite impulse response (FIR) 302 receives as input analog to digital converted samples and outputs equalized samples. The equalized samples output by FIR 302 include baseline wander. In this embodiment, the tail is removed using detector 304 and tail generator 306. Detector 304 inputs the equalized samples from FIR 302 and outputs decisions. These decisions are passed to tail generator 306. A model or estimate of the tail is generated by tail generator 306; in various embodiments, tail generator 306 is implemented using a variety of models or generators. The tail is removed from the equalized samples of FIR 302 and samples with the tail removed are passed to detector 308, for example to perform error correction.

In some embodiments, the point in a processor at which the tail is removed may vary from the example shown herein. In some embodiments, the tail is removed at some point further upstream, for example using analog signals and/or prior to filtering by an FIR.

Using decisions to remove or compensate for baseline wander may offer some advantages over other techniques. In some embodiments, an offset loop is not needed and no noise is introduced as a result of an offset loop. Compared to techniques that discard information at low frequencies (e.g., using a differentiator), the techniques disclosed herein do not necessarily do so; in some embodiments, only a model or estimate of the tail is removed.

In various embodiments, detector 304 is a decision feedback equalizer (DFE) and/or detector 308 is a Viterbi decoder. In some cases, it is desirable for detector 304 to be faster or have a lower latency than detector 308. In some cases, a DFE has a lower latency than a Viterbi decoder. In some embodiments, using a DFE is attractive because it is relatively simple to design and/or is small. The following figures illustrate some example components that are used in some embodiments for detector 304 and tail generator 306. In some embodiments, some other components are used for detector 304, tail generator 306, and detector 308 than the examples described herein.

Figure 4:
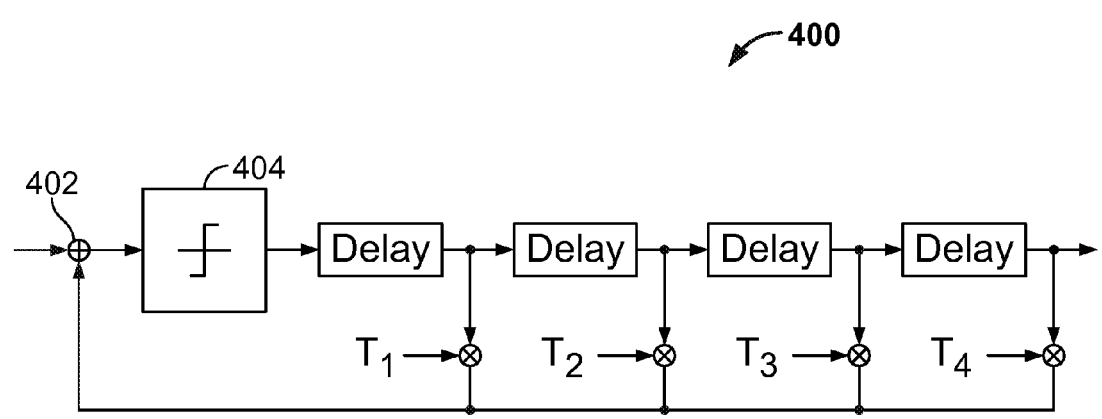
FIG. 4 is a diagram illustrating an embodiment of a DFE.

FIG. 4 is a diagram illustrating an embodiment of a DFE. In some embodiments, DFE 400 is used to implement detector 304 of FIG. 3. In some embodiments, some other circuit is used to implement detector 304.

In the example shown, input samples are passed to adder 402. The output of adder 402 is passed to slicer 404. In this embodiment, slicer 404 outputs a 1 for input values that are greater than zero and outputs a 0 or −1 for values that are less than zero. DFE 400 includes a series of four delay elements where the output of a delay element is passed to its neighboring delay element. The output of each delay element is multiplied by a respective parameter (i.e., parameters $T_1$, $T_2$, $T_3$, or $T_4$). After being multiplied by the appropriate parameter, the products are passed to adder 402 where they are summed with the (current) input sample. The output of the last delay element is the output of DFE 400.

Figure 5:
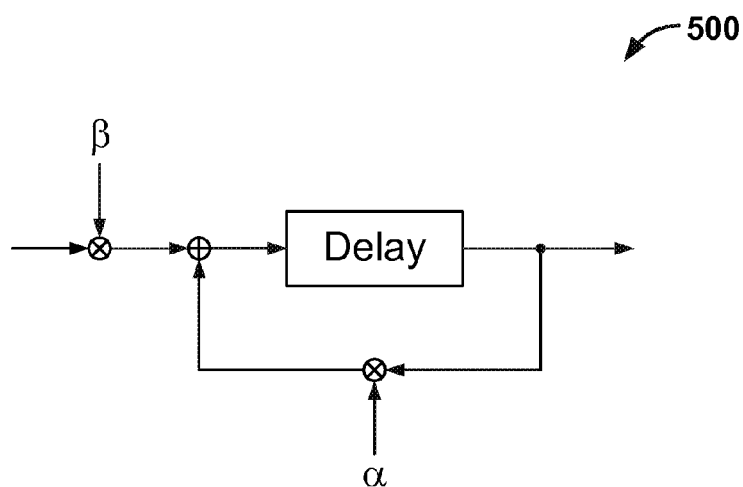
FIG. 5 is a diagram illustrating an embodiment of a tail generator.

FIG. 5 is a diagram illustrating an embodiment of a tail generator. In some embodiments, circuit 500 is used to implement tail generator 306 of FIG. 3. In some embodiments, some other circuit is used. In the example shown, a first order pole is used to model a tail associated with baseline wander. In this embodiment, $$\frac{\beta}{1 - \alpha D}$$

is used. This can be re-written as $$y_i = \frac{\beta x_i}{1 - \alpha D}$$

and then $y_i = \beta x_i + \alpha y_{i-1}$ where x are input samples and y are output samples; circuit 500 corresponds to these equations. In some embodiments, some other equation or model is used, such as a higher order pole, an exponential decay, a linear function, etc. In some embodiments, the output of the example circuit is at some other point besides after the delay element, for example after the adder.

In the example shown, decisions are received from an upstream detector, such as a DFE or other decoder, and are input to the example tail generator. Circuit 500 uses the first order pole $$\frac{\beta}{1 - \alpha D}$$

to generate a tail model. This estimated or generated tail is then removed from a signal from which the decisions were made (e.g., equalized samples output by an FIR). The signal with the tail removed is then processed by a detector, for example by a Viterbi decoder.

In various embodiments, the parameter $\alpha$ and the parameter $\beta$ (or any other tail generation parameter) are obtained a variety of ways. In some embodiments, a least squares (LS) based technique, such as the LMS algorithm, is used to select or optimize a tail generation parameter (i.e., minimize $E[e^2]$). In some embodiments, a tail generation parameter is obtained or optimized simultaneously with parameter(s) for detector 304 (e.g., parameters $T_1$-$T_4$ in the example of FIG. 4) and/or parameter(s) for FIR 302. In some embodiments, there is some training process or period during which one or more parameters are selected.

In various embodiments, the parameter $\beta$ may be jointly optimized with the equalizer and target parameters (e.g., parameters $T_1$-$T_4$ in the example of FIG. 4), where the optimum condition corresponds to a minimum mean squared error between the equalized samples with the generated tail removed and the expected samples produced by the target parameters and correct decisions. In this example, the parameter $\beta$ is considered to be an additional target parameter (e.g., parameter $T_5$) as the error to be minimized has a linear dependence on $\beta$. In some embodiments, the tail time-constant parameter α may be chosen to minimize bit error rate, mean squared error or maximize the target DC response (e.g., $T_1+T_2+T_3+T_4$).

In some cases, the parameter α is less than but close to one. In some embodiments, to describe the value of α in an efficient manner, α is described or represented as $(1-2^{-l}-2^{-m})$, where l and m are positive integers. For example, if l and m are 6 and 9, respectively, then α is $(1-2^{-6}-2^{-9})$. In general for such embodiments, $\alpha=1-\Sigma 2^{-k_i}$ (i.e., any number of $2^{-ki}$ may be subtracted from 1).

Figure 6:
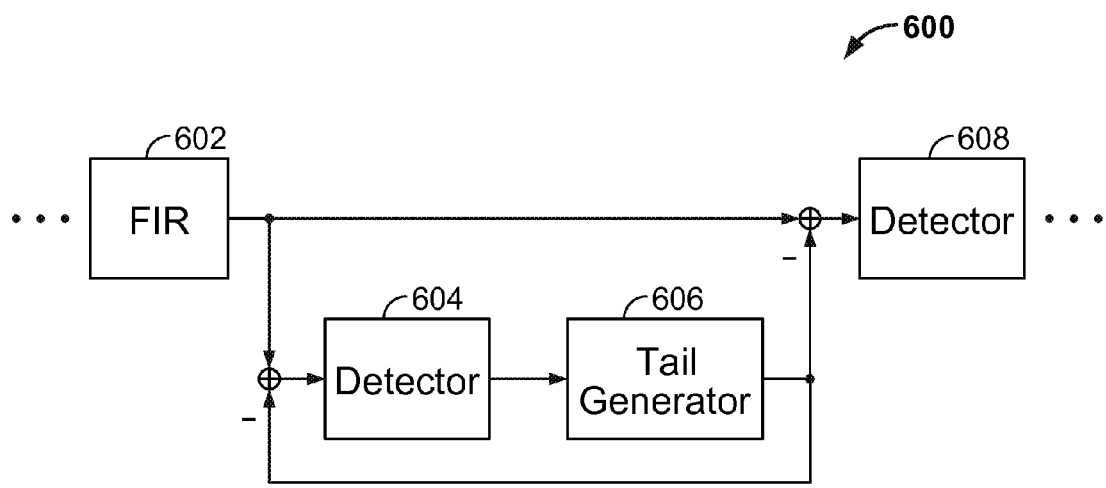
FIG. 6 is a diagram illustrating an embodiment of a system for removing a tail associated with baseline wander in which the tail is removed before processing by a first detector.

FIG. 6 is a diagram illustrating an embodiment of a system for removing a tail associated with baseline wander in which the tail is removed before processing by a first detector. In the example shown, system 600 is similar to system 300 shown in FIG. 3. In various embodiments, detector 604 is a DFE and/or detector 608 is a Viterbi decoder. In this example, a model or estimate of the tail output by tail generator 606 is removed from the equalized samples output by FIR 602; this signal is then passed to detector 604. Detector 604 outputs decisions which are passed to tail generator 606. A model or estimate of the tail is generated by tail generator 606 and this is removed from the equalized samples before being processed by detector 608. In this example, two adders are shown (one for detector 608 and one for detector 604); in some embodiments a single adder is used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for removing baseline wander, comprising:
   a first detector configured to generate a first decision signal from an input signal, wherein the input signal is associated with perpendicular recording on a magnetic disk;
   a processor configured to:
   estimate baseline wander associated with the input signal using the first decision signal; and
   remove the estimated baseline wander from the input signal; and
   a second detector configured to generate a second decision signal from the input signal with the baseline wander removed.

2. A system as recited in claim 1, wherein the first detector includes a decision feedback equalizer (DFE).

3. A system as recited in claim 1, wherein the second detector includes a Viterbi decoder.

4. A system as recited in claim 1 further includes a finite impulse response (FIR) filter, wherein the input signal is obtained from the FIR filter.

5. A system as recited in claim 1, wherein the processor is configured to estimate including by estimating a tail associated with baseline wander.

6. A system as recited in claim 1, wherein the processor is configured to estimate including by using a first order pole.

7. A system as recited in claim 1, wherein the processor is configured to estimate including by selecting value(s) for one or more parameter(s).

8. A system as recited in claim 1, wherein the processor is configured to estimate including by selecting value(s) for one or more parameter(s) that are selected simultaneously with value(s) for one or more parameter(s) associated with the second detector.

9. A system as recited in claim 1, wherein the processor is configured to estimate including by selecting value(s) for one or more parameter(s) that are selected simultaneously with value(s) for one or more parameter(s) associated with a finite impulse response (FIR) filter.

10. A system as recited in claim 1, wherein the first detector is configured to generate the first decision signal including by performing detection on the input signal with the estimated baseline wander removed to obtain the first decision signal.

* * * * *